United States Patent [19]

Swagerman

[11] Patent Number: 5,668,994
[45] Date of Patent: Sep. 16, 1997

[54] CONVERSATION MANAGEMENT ROUTINE FOR CO-OPERATIVE PROCESSING APPLICATIONS

[75] Inventor: Richard E. Swagerman, Scarborough, Canada

[73] Assignee: International Business Machines Corporation, Armonk, N.Y.

[21] Appl. No.: 235,042

[22] Filed: Apr. 29, 1994

[30] Foreign Application Priority Data

Apr. 30, 1993 [CA] Canada .................................. 2095311

[51] Int. Cl.$^6$ ...................................................... G06F 9/00
[52] U.S. Cl. ........................................................ 395/672
[58] Field of Search ............................ 395/650, 700, 395/672, 673, 200.12; 364/DIG. 1, 228.2, 230, 230.3

[56] References Cited

U.S. PATENT DOCUMENTS

| | | | |
|---|---|---|---|
| 4,625,081 | 11/1986 | Lotito et al. | 379/88 |
| 4,949,254 | 8/1990 | Shorter | 364/200 |
| 4,969,092 | 11/1990 | Shorter | 364/200 |
| 5,062,037 | 10/1991 | Shorter et al. | 364/200 |

OTHER PUBLICATIONS

Virtual Machine/Enterprise Systems Architecture, Connectivity Planning, Administration, and Operation, IBM Corporation, Release 7, Appendix E, pp. 183–190, Jun. 1990.

Primary Examiner—Alvin E. Oberley
Assistant Examiner—Majid A. Banankhah
Attorney, Agent, or Firm—Marilyn Smith Dawkins

[57] ABSTRACT

The system implementation of a computer system which implements multiple virtual machines, and forms one station in a network including at least one other station running a program for which the one station can, on request, perform host processes using virtual machines which it implements, and which has the resources to provide a pool of preconfigured virtual machines to service such requests, includes a routine to manage conversations associated with such requests by responding to events relating to such conversations. The conversation management routine includes a main task and a sub-task spawned by the main task to preestablish an exit from the routine in the event of error. The sub-task also includes routines called selectively to handle different events relating to conversations, and is associated with an array, which contains data as to the identity and status of virtual machines in said pool of preconfigured machines, and is established and maintained by the sub-task in accordance with said events. The main task is a routine which controls spawning or waking-up of the sub-task in direct response to an event, and kills or leaves dormant the sub-task in response to messages from the sub-task following processing of an event.

12 Claims, 2 Drawing Sheets

CONVERSATION MANAGEMENT ROUTINE FOR CO-OPERATIVE PROCESSING APPLICATIONS

BACKGROUND OF THE INVENTION

This invention relates to the management of resources of computer systems at stations in a network, and more particularly to the making available over the network of processing resources in the form of preconfigured virtual machines.

DESCRIPTION OF THE RELATED ART

Where the hardware and operating system at a station in the network supports the setting-up, and utilization of multiple virtual machines, sufficient resources may be available to permit a pool of such virtual machines to be maintained to service network requests, after it has provided for its own normal requirements for servicing internal and network management and application requirements.

It can be advantageous for such a system to be able to make available over the network such a service pool of preconfigured virtual machines for use in independent applications by other stations in the network, or even by itself in the event of an unusual demand, since such machines may remain logged on, saving the initialization time incurred between transactions that is incurred when virtual machines are logged on only on demand, and may also provide alternative access to local resources such as data files.

Such a service pool concept has been proposed in the documentation relating to the VM/ESA (trademark) operating system from IBM Corporation. Specifically the publication Virtual Machine/Enterprise Systems Architecture (trademark), Connectivity Planning, Administration, and Operation, Release 7, published June 1990 by IBM Corporation, provides in Appendix E (pages 183–190) an "Introduction to Service Pool Support" in which the necessity is discussed of a process, referred to as a Conversation Management Routine (CMR), for managing the service pool and the basic functions which must be implemented in such a routine are discussed under the heading "Considerations For Writing and Installing a CMR".

SUMMARY OF THE INVENTION

To the best of the present inventor's knowledge, such a CMR (and thus the service pool concept itself) has not to date been implemented. In endeavouring to implement the CMR, it was found that it was insufficient merely to implement handling of the various events, and that the CMR must provide adequate comprehensive tracking of the status of the available Service Pool Machines, as well as an error handling strategy that prevents abnormal ending of events from prejudicing the integrity of substantial parts of the system. This is achieved by implementing the CMR as a tiered structure, in which a main task exercises only supervisory management and reacts to events by spawning or waking up a subprocess which actually handles the events and manages a data array relating to the identity and status of virtual machines in the service pool. Whilst the above publication recognizes the necessity for establishing a sub-task to provide an exit following abnormal endings to CMR operations, it has been found that the above objectives are facilitated by having the sub-task also handle the events themselves.

BRIEF DESCRIPTION OF THE DRAWINGS

The invention is set forth and described further in the appended claims and the following description with reference to the accompanying drawing, in which:

DETAILED DESCRIPTION OF THE INVENTION

Although not restricted in its application to such a system, the invention is described with reference to an exemplary application to a virtual machine computer system operating under the VM/ESA operating system and connected into a Systems Network Architecture (SNA) network. A number of acronyms and abbreviations will be utilized, including the following:

ABEND Abnormal ending

ALTUSER The user ID of the "end-user" for which the worker machine is authorized to perform. The worker machine that is performing the work acts on behalf of the "end user machine". The ALTUSER (end-user) has the same authority as the worker machine (Server) to access resources.

API Application Program Interface

APPC/VM Advanced Program-to-Program Communications/VM is an API for communicating between two Programs that is mappable to SNA LU 6.2 APPC functions. Along with the TSAF virtual machine, APC/VM provides this communication within a single system and throughout a collection of systems.

AVS APPC/VM VTAM Support is a component of VM/ESA that lets application programs using APPC/VM communicate with programs anywhere in a network defined by IBM's SNA. AVS transforms APPC/VM into APPC/VTAM protocol.

CMS Conversational Monitor System is a VM operating system component of VM/ESA that provides general interactive time sharing, problem solving, program development capabilities, and operates under the control of the VM Control Program.

CP Control Program is a component of VM/ESA that manages the resources of a single computer so multiple computing systems appear to exist. Each virtual machine is the functional equivalent of an IBM system/370.

GCS Group Control System is a component of VM/ESA, consisting of a shared segment that the user can IPL and run in a virtual machine. It provides simulated MVS services and unique supervisor services to help support a SNA network.

LU Logical Unit

LU6.2 A set of protocols and services defined by IBM's Systems Network Architecture for communication between application programs.

PWS Programmable Work Station—origin of requests.

SNA Systems Network Architecture

TSAF Transparent Services Access Facility is a component of VM/SP that handles communication between programs by letting APPC/VM paths span multiple VM systems. TSAF lets a source program connect to a target program by specifying a name that the target has made known, instead of specifying a user ID and node ID.

VM Virtual Machine

VTAM Virtual Telecommunications Access Method is a program that controls communication and the flow of data in a computer network. It provides single-domain, multiple-domain, and multiple-network capability. VTAM runs under MVS, OS/VSI, VMESA, and VSE.

Figure 1:
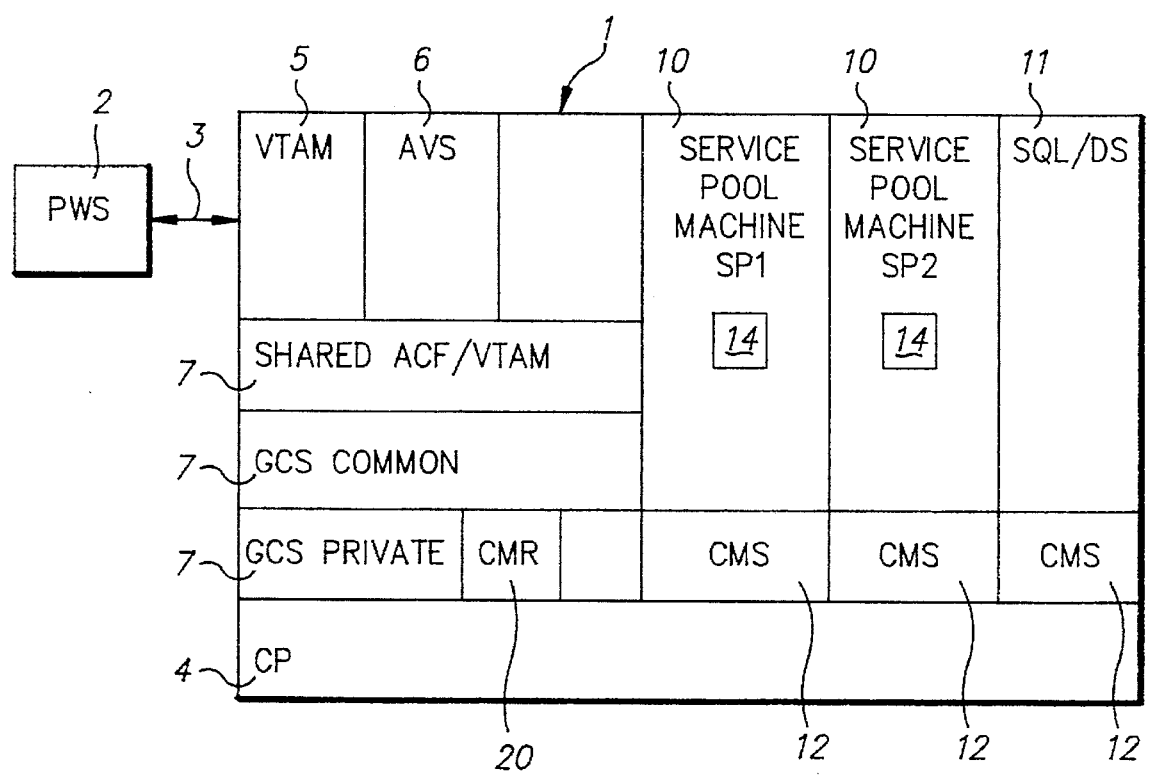
FIG. 1 shows schematically a system communication with a remote system through a network operating under the VM/ESA operating system and in connection.

Referring first to FIG. 1, there is schematically shown a portion of a computer network, namely a computer system 1 running the VM/ESA operating system and having the resources to support multiple virtual machines under that system, and a programmable work station (PWS) 2, connected by a connection 3 as logical units or stations in an SNA network utilizing the LU6.2 protocol and service set. In practice the network is likely to be more extensive and may include further VM/ESA systems, but only sufficient is shown for purposes of explanation since the present invention is essentially concerned with the management of service pool request within a network station or logical unit. Station 2 therefore represents a source or sources of service pool requests from outside station 1.

In station 1, various components of the operating system are shown. Only such components and such features of these components as are necessary for an understanding of the present invention will be described. Further details of the VM/ESA operating system may be found in the publications of IBM Corporation relating thereto and listed in the publication referred to above. The components will in general be operating in virtual machines set up within the system. A virtual machine control program CP, designated by reference numeral 14, implements APPC/VM amongst other functions. A program VTAM designated by reference numeral 5 controls network communications, and a program AVS, designated 6, permits application programs using APPC/VM to communicate over the network through a protocol administered by VTAM. A further program provides Advanced Communication Function for Virtual Telecommunications Access Method, ACF/VTAM. Further network support services are provided by components 8 and 9, which are common and private segments of the group support system GCS.

Established within station 1 are service pool virtual machines 10 of which two, SP1 and SP2, are shown. These are private server machines running private resource managers 14. Further virtual machines may of course be active within the system in connection with application programs, for example an SQL data server 11. Component 12 represents the Conversational Monitor System (CMS) which is a component of the operating system. In order to manage conversations over the network with the service pool machines 10, a Conversation Management Routine (CMR), component 20 is utilized within the GCS as described in more detail below.

A program requesting use of a Service Pool Machine will reside at a station (PWS) on the network, for example the station 2, although a request could originate within the station 1.

The inbound connection from user programs will specify a logical unit name of a gateway and a transaction program name (TPN) as the destination. The gateway LU specified must have a CMR associated with it. It is assumed that a gateway LU using a CMR receives only service pool requests.

The virtual machine ID to which the request will be routed will be determined by the gateway's associated CMR, running in the AVS (APPC/VM VTAM Support) machine. The AVS machine containing the CMR must be local, i.e. at the same station, to the CP system that requires its support. The Service Pool machines managed by the CMR must exist on the same CP system as the CMR. The exemplary CMR to be described does not manage Service Pool machines remotely via Transparent Services Access Facility (TSAF).

The CMR consists of two components, namely a CMR Main Task component, and a CMR Sub-Task component. The CMR Main Task appears as the conversation management routine specified for the gateway on an AVS ACTI-VATE GATEWAY command. AVS invokes the CMR Main Task via a macro provided by the GCS and passes it a parameter list of addresses. The CMR Main Task's responsibilities are to:

a) receive control from the AVS,
b) attach and detach a CMR Sub-Task,
c) post a CMR Sub-Task ECB,
d) wait on CMR Sub-Task and system ECBs,
e) return control to the AVS, A CMR Sub-Task is spawned by the CMR Main Task to process an AVS event. The CMR Sub-Task's responsibilities are to:

a) receive control from the system (when the CMR Sub-Task is attached) or "wake up" when the CMR Sub-Task ECB is posted,
b) establish, for use in the event of ABENDS occurring during handling of events by the sub-task, a preestablished exit routine, and cancel it if not needed,
c) process AVS events,
d) post CMR Main Task ECB,
e) wait on CMR Sub-Task ECB.

Tracing of the CMR may be performed using facilities provided by the GCS.

The CMR will be loaded into GCS private storage when AVS activates the private gateway LU with the ACTIVATE GATEWAY command. A CMR is required for each CP system that requires such support (see FIG. 1). An AVS machine containing the CMR must be local to the CP system that requires support.

AVS is defined to VTAM as the owner of a private gateway LU that allows access to the system (Station 1). All inbound and outbound private conversations for CP in Station 1 will be processed through this gateway, and requests through this gateway will invoke the CMR which will manage the local Service Pool Virtual Machines (SP1 and SP2). The resource manager is a set of programs or task handler that processes application requests and is known by a common resource name which need only be unique within the server machine.

The following sequence of events will illustrate the flow of an inbound service pool request to the CP system (see FIG. 1).

1. SP1 is a Service Pool virtual machine user ID and will be autologged when needed.

2. A remote program (for example at Station 2) initiates an ALLOCATE conversation with a private Service Pool Resource. The remote program specifies the gateway LU name and TPN, the later being the common resource name assigned to the resource managers of all Service Pool machines.

3. GATEWAY 1 is defined as being owned by AVS to VTAM so VTAM will route the request to AVS.

4. Since the CMR is associated with the gateway, AVS will invoke it with an INALLOC (inbound allocate) event.

5. CMR will pass back to AVS the selected Service Pool Virtual Machine ID. For this example it passes back SP1.

6. AVS1 will translate the incoming connection request to an APPC/VM CONNECT request for the private resource manager located at SP1.

7. The CP will verify from a TSAF collection that the userid and password pair flowed with the request is valid.

8. If the pair is NOT valid, the connection request is rejected and a connection is NOT established, the AVS will invoke the CMR with a DEALLOCATE event.

9. If valid, CP will route the APPC/VM CONNECT request along with the verified userid to the SP1 resource manager.

10. If SP1 is not logged on, CP will automatically log it on and invoke its resource manager.

11. SP1's resource manager (task handler) will issue an ACCEPT to establish a conversation with the remote program.

12. The CP presents the Service Pool Machine with the userid of the originating PWS in a field of a connect pending interrupt.

13. On completion of its request, the origination PWS will issue a DEALLOCATE to SP1.

14. SP1's Task Handler is notified that the conversation is ending, and the conversation is then deallocated.

15. The AVS will invoke the CMR to indicate conversation with SP1 is deallocated.

16. CMR will mark SP1 as available for other requests.

The CMR Main Task will be called via its main entry point when certain AVS events occur associated with the gateway. The CMR Main Task will determine which event caused the invocation from an 'event-name' field of a parameter list passed to it by the AVS. Based on the content of this field, the CMR Main Task will determine whether to spawn (ATTACH) a new CMR Sub-Task or to "wake-up" (POST) an existing CMR Sub-Task.

The CMR Sub-Task must perform specific functions based on the Event type that is passed, as set forth in Table 1. The parameter lists associated with these events are set forth in Tables 2–7.

Each AVS parameter list will include a userword. AVS does nothing with the userword except pass it with all parameter lists, and store its updated value on return from the CMR. The CMR will store the address of the CMR Control Block (see below) into the userword during ACTIVATE event processing. Subsequent event parameter lists would then contain this address so that addressability of the CMR Control Block is maintained.

TABLE 1

Avs Events. This table describes the functions performed by the CMR Sub-Task based on the event type.

| EVENT: | PURPOSE: |
| --- | --- |
| Activate | To Set up the Service Pool environment this event will: Read Service Pool environment parameters Set up Service Pool Contol Block with an entry for each Service Pool machine indicating status etc. LOGOFF all Service Pool virtual machines to ensure a cold start. |
| Deactivate | To terminate the Service Pool environment this event will: Perform clean up processing (detach sub-tasks, free memory) |
| Inbound allocate | To assign a Service Pool machine for inbound request this event will: Search Service Pool Control Block for an available Service Pool virtual machine. Update Service Wool Control Block with new status. |
| Deallocate | To Allow a Service Pool machine to be available for new requests this event will: Update Service Pool Control Block with new status. |
| Attention loss | To recover from VTAM attention loss this event will: SEVER connections to Service Pool machines associated with session. LOGOFF Service Pool machines. Update Service Pool Control Block with intialized status. |
| Abend | To recover from AVS abend this event will: LOGOFF Service Pool machines. |

TABLE 2

Activate Event Parameter List

| Field Length/Type | Contents |
| --- | --- |
| 8 char | 'ACTIVATE' (event name) |
| 1 numeric | length of gateway LU name |
| 1–17 char | gateway LU name |
| 4 pointer | user word points to CMR control block. |

TABLE 3

Deactivate Event Parameter List

| Field Lengh/Type | Contents |
| --- | --- |
| 8 char | 'DEACTIV' (event name) |
| 1 numeric | length of gateway LU name |
| 1–17 char | gateway being deactivated |
| 4 numeric | conversation causing error deactivate (0=normal deactivate command). |
| 4 pointer | user word points to CMR control block. |

TABLE 4

Inbound Allocate Event Parameter List

| Field Length/Type | Contents |
| --- | --- |
| 8 char | 'INALLOC' (event name) |
| 1 numeric | length of gateway LU name with allocate. |
| 1–17 char | name of gateway LU with allocate |
| 1 numeric | length of partner LU name |
| 1–17 char | name of partner LU |
| 8 char | logon mode name |
| 1 numeric | length of transaction program name |
| 1–64 char | transaction program name |
| 1 numeric | length of access userid |
| 1–10 char | access userid |
| 4 numeric | VTAM conversation id |
| 8 numeric | VTAM seesion id |
| 8 char | Output LU name qualifier, must be USERID to have conection proceed as a private server connection. |
| 8 char | output: LU name to use on connect |
| 8 char | output: ID for alternate userid (ALTUSER). |
| 4 numeric | output: completion flag |
| 4 pointer | userword points to CMR control block. |

TABLE 5

Deallocate Event Parameter List

| Field Length/Type | Conents |
| --- | --- |
| 8 char | 'DEALLOC' (event name) |
| 2 numeric | VM conversation id |
| 4 numeric | VTAM conversation id |
| 4 pointer | userword points to CMR control block. |

TABLE 6

Attention Loss Event Parameter List

| Field Length/Type | Contents |
|---|---|
| 8 char | "ATTENLOSS' (event name) |
| record | plist passed from VTAM |
| 4 pointer | VTGAM ACB address |
| 4 numeric | name of VTAM subexit |
| 4 pointer | address of R/O VTAM RPL |
| 4 pointer | userord pints to CMR control block. |

TABLE 7

Abend Event Parameter List

| Field Length Type | Contents |
|---|---|
| 8 char | 'ABEND' (event name) |
| 4 pointer | userword points to CMR control block. |

The CMR makes use of several files and control blocks for data storage namely a Service Pool Configuration File, an alert file to record alert data, a CMR Communications Area, a CMR Control Block, a Service Pool Control Block, an Input Parameter List for the message generation, a CMR diagnostics work area, and an area for CMR error tracing information.

The Service Pool Configuration File is accessed only during an ACTIVATE event to provide data for the Service Pool Control Block which is set up by the CMR Sub-Task. The CMR will access a Service Pool Configuration file via GCS macros. This file will be created in the CMS by the system administrator to contain the list of Service Pool virtual machine IDs that are available to the CMR. The Service Pool Configuration File includes a control record that specifies the number of detail records in the file (excluding the control record), followed by detail records. Each detail record will contain the userid of a Service Pool machine. The name of the file, specified by a GCS file command, is the name of the gateway associated with the CMR. The CMR will access this file on an AVS ACTIVATE event and set up its control blocks accordingly.

A separate file is made available for each CMR to be provided. If multiple CMR's will exist on the same system, then the system administrator must issue a GCS file specifying command prior to each AVS ACTIVATE command. The command will specify the filename that corresponds to the CMR to be specified on the next ACTIVATE command. The file name specified for each command must be the gateway name and the file name must be different for each CMR. It is required that each different CMR manage service pool machines that are not managed by any other CMR, and thus each CMR will have a Service Pool Configuration file containing Service Pool Machine ids that are not contained in any other Service Pool configuration file. The contents of this file are only read on activation of the gateway, and therefore, any changes to this file will not take effect until the associated gateway has been DEACTIVATED and re-ACTIVATED.

The CMR Communication Area contains information passed between the CMR main task and sub-task between invocations, as set forth in Table 8. The CMR Control Block is initialized by, and provides local storage for, the CMR sub-task, as shown in Table 9. The Service Pool Control Block is initialized by the sub-task during the ACTIVATE event routine and released during the DEACTIVATE routine, and stores data from the Service Pool Configuration File as well as status data for each service pool virtual machine, as shown in Table 10. The Input Parameter List for message input parameters, the Diagnostic work areas and the trace information area, shown in Tables 11, 12 and 13 are used in connection with error handling as described further below.

TABLE 8

CMR Communications Area

| Field Length/Type | Description |
|---|---|
| 8 char | Label |
| 4 pointer | points to CMR Main Task ECB |
| 4 pointer | points to CMR Sub-Task ECB |
| 4 numeric | system ECB |
| 4 numeric | Task Identifier |
| 4 pointer | points to AVS prameter list |
| 8 char | AVS event name |
| 2 numeric | Gateway name length |
| 17 char | Gateway name |
| 8 char | DDNAME used for configuration file |

TABLE 9

CMR Control Block

| Field Length/Type | Description |
|---|---|
| 8 char | Label |
| 1 char | Will flag is the CMR is in shutdown mode and is not processing any requests except a DEACTIVATE event. |
| 1 char | Will indicate whether Service pool Control Block exists. |
| 4 pointer | Points to the beginnng of the first entry in the Service Pool control block. |
| 4 numeric | Contains the number of entries in the Service Pool control block array. |

TABLE 10

Service Pool Control Block (one entry for each VM in pool)

| Field Length/Type | Contents |
|---|---|
| 8 char | Label |
| 8 char | VM Userid name (unique in aray) |
| 1 char | The current status of the Service Pool ID) |
| 4 numeric | VTAM conversation ID |
| 8 numeric | VTAM session ID |
| 8 char | Last AVS event for this pool ID |

TABLE 11

Message Control Block

| Field Length/Type | Contents |
|---|---|
| 8 char | Caller's module name |
| 4 pointer | Points to start of sub list |
| 4 pointer | Points to message text area |
| 2 numeric | message length |
| 2 numeric | message identifier |
| 1 numeric | mesage format |

TABLE 12

Diagnose Work Area

| Field Length/Type | Contents |
| --- | --- |
| 8 char | macro that caused the abend |
| 4 char | system abend code |
| 4 char | user abend code |
| 4 pointer | points to automatic storage |
| 1 char | previous abend indicator |
| 3 char | reserved |
| 60 char | retry registers |
| 4 char | Register save area for possible abends. Array of multiple elements each of 16 registers. |
| 300 char | automatic storage for exit routine. |
| 3 char | address of next instruction to be executed. |

TABLE 13

CMR Trace Information

| Field Length/Type | Contents |
| --- | --- |
| 8 char | Caller's module name |
| 8 char | AVS gateway |
| 8 bit | trade flags (first bit indicates that trace generation is enabled) |
| 3 char | unused. |
| 1 char | trade identification (specifies type of trace). |
| 4 numeric | Value of return code that is to be traced. |
| 4 pointer | points to control block that is to be traced. |
| 8 char | value of userid that is to be traced. |
| 8 numeric | VTAM RPL session ID that is to be traced. |
| 4 pointer | points to CMR diagnose work area |
| 40 char | freeform text |

Figure 2:
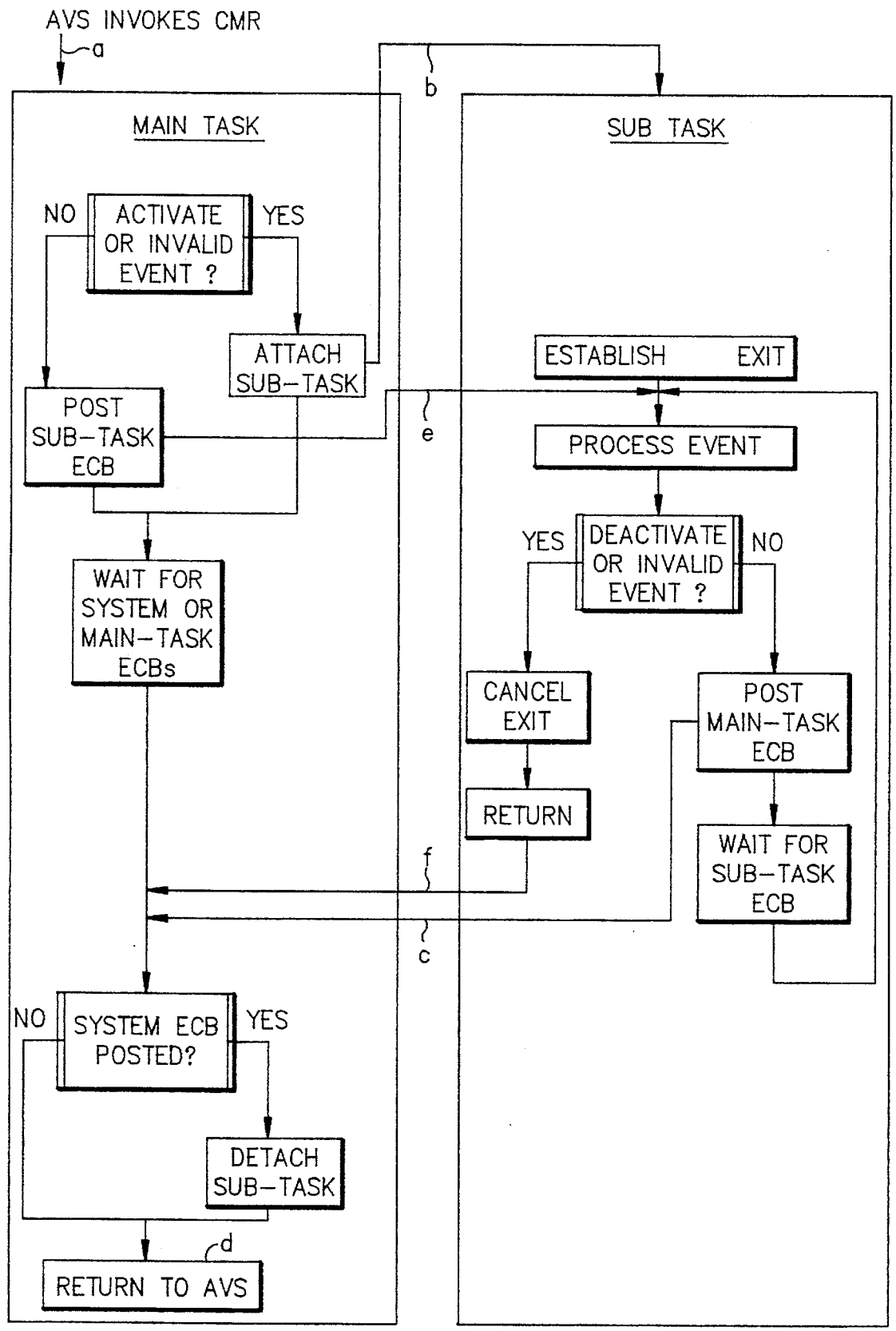
FIG. 2 is an outline flow diagram of the conversation management routine.

Referring to FIG. 2, the overall process flow between the AVS and the CMR is as follows:

(1) The CMR is invoked (a). AVS calls the CMR at CMR Main-Task's entry point. The CMR Main-Task determines the event type.

(2) The CMR Sub-Task is attached (b) or (e). A CMR Sub-Task ECB is posted. If the event type is ACTIVATE or is invalid, CMR Main-Task issues an ATTACH macro to spawn a Sub-Task (b). The sub-task will process the event. For all valid events (except ACTIVATE), the CMR Main-Task issues a post macro to trigger the CMR Sub-Task (e). The POST macro causes the CMR Sub-Task to 'wake-up' and process the event.

(3) The CMR Main-Task ECB is posted (c) or a System ECB is posted (f).

After processing all events (except DEACTIVATE or invalid events), the CMR Sub-Task issues a post macro to trigger the CMR Main-Task (c). The CMR Sub-Task then waits for the CMR Sub-Task ECB to be posted (e). After processing a DEACTIVATE event or invalid events, the CMR Sub-Task cancels the abend exit routine and terminates. This causes the system ECB to be posted. When the system or CMR Main-Task ECB is posted, the CMR Main-Task 'wakes-up'.

(4) Return to AVS.

Prior to returning to AVS, CMR Main-Task determines whether the CMR Sub-Task terminated (i.e. if the system ECB was posted). If the CMR Sub-Task terminated, CMR Main-Task detaches the Sub-Task.

CMR Main-Task returns control to AVS (d).

The CMR Main-Task and modules of the CMR Sub-Task will now be described further.

The CMR Main-Task will be invoked via its main entry point when certain AVS events occur associated with its gateway LU. This module will determine which event caused the invocation from the event-name field of the AVS parameter list.

The steps performed by this module are:

1. Based on the event-type, determine the userword value.
2. For ACTIVATE or invalid event types:
   Allocate storage for the CMR Communication area and insert the its label.
3. For all other event types:
   If the label of the CMR Communication area is not valid, or the userword is null then ensure an alert will be issued by the CMR Sub-Task. If an alert was written by CMR Sub-Task and the event type was INALLOC, ensure that the completion flag is updated to indicate no retry.
4. Set the remaining fields in the CMR Communication area. The ddname field is determined as follows:
   a. If the event-type is ACTIVATE: If the input gateway name length is valid, (i.e. greater than 0, less than 18) then extract the gateway name and use it as the ddname. If the input gateway name length is not zero, then use the first 17 characters of input gateway name and use a default ddname. If the input gateway name length is zero, then the gateway name is a null string and a default ddname is used.
   b. If the event-type is invalid, then the gateway name is a null string and a default ddname is used.
   For INALLOC and DEACTIVATE event-types, if the input gateway name or gateway name length are not the same as the values in the CMR communication area then set a default ddname.
5. If event-type is ACTIVATE then set the userword to the address of the CMR Communication area.
6. Clear the CMR Main-Task ECBG to zeros.
7. If the event-type is ACTIVATE or invalid:
   Set the system ECB in the CMR Communication area to zeros, and attach the CMR Sub-Task. If the attach was successful then set the task identifier of CMR Communication area to the two low-order bytes of the user word. If the
   attach failed, then set the userword to NULL, free the CMR Communication area and return to AVS.
8. For all valid event types (except ACTIVATE) post the CMR Sub-Task ECB (using the pointer which the Sub-Task has set in the CMR Communication area).
9. Wait for the CMR Main-Task or system ECB to be posted.
10. When the system ECB is posted, detach the CMR Sub-Task (using the task identifier) saved in the CMR communication area). Set the userword to NULL, and free the CMR Communication area.
11. Return.

The CMR Sub-Task mainline will be invoked either as a result of the attach macro or the post macro issued by the CMR Main-Task. This module will determine which event caused the invocation from the event-name field of the AVS parameter list. Based on the content of this field, it will drive the appropriate external event routine.

The steps in this module are:

1. Receives control with a register pointing to the CMR communication area.
2. Establishs as an exit routine (see below).

3. Establish addressability to the trace information area, CMR control block, message area and CMR alert record.
4. Set a continue flag to true.
5. Perform the following steps while continue is true.
   a. Establish addressability to AVS parameter list.
   b. If the event type is valid then:
      If the gateway name was unknown (as determined by the CMR Main-Task) then issue a message indicating "gateway name invalid", using the message generating subroutine described below. For all events except ACTIVATE, OUTALLOC and DEACTIVATE:
         If the CMR is in shutdown mode then issue a message "did not receive a Deactivate".
         If the Service Pool Control block does not exit then issue a message "service pool control block not set up".
   c. For invalid event type:
      Call the subroutine described below to write a CMR alert record.
   d. For all valid events, call the corresponding CMR subroutine to process the event.
   e. If the processed event was INALLOC then update the following AVS parameter list output variables, namely LU name qualifier, LU name to use on connect, ID for alternate userid, and completion flag.
   f. If the CMR is not in shutdown mode and errors have occurred then set a shut-down bending flag.
   g. For all events except DEACTIVATE and invalid events, clear the CMR Sub-Task ECB to zeros, post the CMR Main-Task ECB (if CMR Main-Task ECBG is not posted) and wait on CMR Sub-Task ECB.
   h. For DEACTIVATE and invalid event types, set the continue flag to false (this will stop the WHILE loop), and set the pointer to the Sub-Task ECB in the CMR Communication area to null.
6. Cancel the preestablished exit routine.
7. Return. (Sub-task ends, therefore the GCS will post the system ECB).

The ACTIVATE sub-routine processes the Activate event, which occurs when the gateway LU (upon which the CMR name has been specified) is activated via the AVS ACTIVATE GATEWAY command. To set up the Service Pool environment this routine will:
1. Read the Service Pool configuration file using GCS open, read, check and close macros. If the first non-command record is not a control record then, this routine will:
   a. Call the message issuing subroutine to issue a message "control record is missing".
   b. Set a return code indicating an error.
   c. Pass control back to the mainline.
   If an I/O error occurs, this routine will:
   a. Call the message issuing subroutine to issue a message "error in reading CMR configuration file".
   b. Set the return code indicating an error.
   c. Pass control back to the mainline.
2. Obtain sufficient storage for the Service Pool Control Block based on number of entries specified in the control record. If storage is not available to perform this, this routine will:
   a. Call the message issuing subroutine to issue a message "insufficient storage is available".
   b. Set the error return code.
   c. Pass control back to the mainline.
3. If the Service Pool Configuration file contains duplicate userids, call the message issuing subroutine to issue message "detail record is invalid".
4. Verify that the number of records actually read from the Service Pool Configuration file matches the number of entries specified on the control record. If the two numbers do not match, then:
   a. Call the message issuing subroutine to issue message "control record is invalid".
   b. Set the error return code.
   c. Pass control back to the mainline.
5. Call the update subroutine described below to set up the Service pool Control Block with an entry for each Service pool machine containing:
   a. Service pool userid from the configuration file.
   b. Current status set to idle.
   c. Conversation and Session is set to zero.
   d. Last event set to 'ACTIVATE'.
6. Call the logoff subroutine described below to ensure the Service Pool machine is logged off.
7. Pass control back to the mainline.

The DEACTIV subroutine processes the Deactivate event, which occurs when the gateway LU is deactivated. To terminate the Service Pool environment this routine will:
1. If the CMR Control Block indicates that a Service Pool Control Block exists, then release the storage previously acquired for the Service Pool Control Block. If an error occurs trying to release storage then write an alert record.
2. Pass control back to the mainline.

The INALLOC subroutine processes the Inbound Allocate event, which occurs when an allocate request flows from VTAM to AVS. To assign a Service Pool machine for an inbound request, this routine will:
1. Search the Service Pool Control Block data structure for an available Service Pool virtual machine, by checking the Current status fields for an idle Service Post ID. If there is no available Service Pool machine:
   a. Set the completion flag output parameter to indicate non-availability.
   b. Pass control back to the mainline.
2. If a machine is available, assign output parameters:
   a. target LU name will be set to the selected Service Pool userid,
   b. completion flag will be set accordingly.
3. Call the update subroutine to update the Service Pool Control Block (for the selected Service Pool userid):
   Set the Current status field of the Service Pool control block to indicate Service Pool machine is active.
   Set the Conversation ID of the Service Pool control block to the VTAM conversation ID.
   Set the Session ID of the Service Pool control block to the VTAM session ID.
   Set the Last event field of the Service Pool control block INALLOC.
4. Pass control back to the mainline.

The DEALLOC subroutine processes the Deallocate event, which occurs when the connection from the AVS to a virtual machine is severed. To allow a Service Pool machine to be available for new requests this routine will:
1. For the Service Pool Control Block entry that matches the supplied VTAM conversation ID, call the update subroutine to:
   Set the Current status field of the Service Pool Control Block to indicate Service Pool machine is idle.

Set the Conversation ID and session id fields of the Service Pool Control Block to zeros.

Set the Last event field of the Service Pool Control Block to DEALLOC.

2. Pass control back to the mainline.

The subroutine ATTNLOSS processes an Attention Loss event, which occurs when the VTAM reports an error on an attention loss. To recover from VTAM attention loss this routine will:

1. Obtain the session ID from VTAM, for all Service Pool machines that match the session:
   a. Call the logoff subroutine to logoff the Service Pool machine.
   b. Call the update subroutine to:
      Set the Current status field of the Service Pool Control Block entry to idle.
      Set the Conversation ID and Session ID fields of the Service Pool Control Block to zeros.
      Set the Last event field of the Service Pool Control Block to ATTNLOSS.
2. Pass Control back to the mainline.

The Logoff Service Pool Machine subroutine will log off all or one of the Service Pool machines contained in the Service Pool Control Block, regardless of their pending status. The steps in this routine are:

1. If only one machine is to be logged off issue the instruction to logoff the Service Pool machine specified by the Userid input parameter.
2. Otherwise all Service Pool machines need to be logged off.

Repeat the following for all entries in the Service Pool control block:

Obtain the VM userid for the next Service Pool machine from the Service Pool Control Block.

Issue the instruction to logoff the Service Pool machine.

The update Service Pool Control Block Entry subroutine will update the Service Pool control block entry using the input parameter fields. The steps in this function are:

1. If an ACTIVATE event is being processed then update the USERID field of the Service Pool Control Block using the input userid.
2. Update the remaining fields in the Service Pool Control Block using the input parameters.

The message issue subroutine will select the appropriate error message in a CMR repository based on a passed parameter, makes the appropriate substitutions and writes the message to the GCS Operator console via a GCS macro. To write the message this routine will:

1. Select the corresponding message text in the message repository.
2. If the message does not exist or the message repository cannot be loaded then this routine will write an alert record, and return to control to the calling.
3. Issue a GSC WTO meassage with the appropriate text.
4. Return control to the calling module.

The following subroutine is established by the sub-task as the preestablished exit subroutine. It will receive control when certain GCS macros called by CMR Sub-Task subroutines abends during event processing.

Each routine that uses such a macro will specify the address that should gain control when an abend occurs for that macro. This is accomplished by saving the address into a final register of one element of the register array of the CMR Diagnose Work Area. The other registers in the of the array are used to save the contents of other registers being used. Each macro uses a different element of the array of the CMR Diagnose Work Area. A further element of the array is used to provide for an unrecognized abend.

The steps in this routine are:

1. Convert the system abend code to character form and save it in the CMR Diagnose Work Area.
2. Convert the user abend code to character form and save it in the CMR Diagnose Work Area.
3. Save the address of the next instruction to be executed into the CMR Diagnose Work Area.
4. Set the previous abend indicator of the CMR Diagnose Work Area to indicate an abend occurred.
5. Determine what caused the abend using the macro field of the CMR Diagnose Work Area. This field will be setup by the routine using the macro.
6. For all known macros:
   Select the appropriate register array element and save all but the final register into the retry registers field of the CMR Diagnose Work Area.
   Select the appropriate register array element and save the final register to provide a return address.
7. For unknown abends:
   Select the appropriate register array element and save all but the final register into the retry registers field of the CMR Diagnose Work Area.
   Select the final register to provide a return address.
   Take a dump.
8. Return, with control going to the saved return address.

The following subroutines assist in tracing errors, if enabled.

The Write Trace Record subroutine will write trace records using a GCS trace generation macro. The steps in this routine are:

1. Issue a GCS macro to retrieve date and time.
2. Use the trade identification field of the Trace Information area to determine which kind of trace is being requested and format the trace data record.
3. Issue the GCS trace generation macro.
4. Examine register contents to confirm that trace generation is enabled. If it is set a "trace on" bit of the trace flags field of the trace Information area to TRUE (otherwise set it to FALSE). If an invalid trace generation status is returned then write an alert record.

The Process CMR Alert subroutine handles CMR alert situation by writing an alert record to the CMR ALERT file. This routine will only write trace records if the trace-on bit of the flags field set is TRUE. This ensures that if the trace routine calls the alert subroutine, then the latter will not write trace records.

The steps of this routine are:

1. Issue a GCS macro to request exclusive control of the CMR Alert file. This routine will not regain control until it obtains control of the CMR Alert file.
2. Issue a GCS macro to execute a FILEDEF command identifying the Alert file.
3. If the FILEDEF fails and the trace-on bit in the trace information area is TRUE then:
   Call the trace subroutine to write a trace record indicating that a FILDEF error occurred.
4. If the FILEDEF was successful then open the CMR Alert file, and if the open is successful then:
   Issue the GCS macro to retrieve the Date and Time.
   Build and issue a write macro to write a CMR Alert record.
   Issue a close macro to close the CMR Alert file.
5. Issue a GCS macro releasing control of the CMR Alert file.

A comprehensive error handling strategy is implemented in the CMR. If the AVS ABENDs, or if the CMR (executing as a called entity of the AVS) ABENDs, the CMR will be called by the AVS ABEND Exit routing specifying the ABEND event. CMR will perform the ABEND subroutine which will logoff the Service Pool machines, and return control to the AVS. If an abend occurs during the ABEND EXIT processing, then AVS abend processing takes control.

If an internal CMR subroutine detects an error that impacts the functions of the CMR, the CMR will place itself into a shutdown mode by setting a pending shut-down flag in the CMR control block. Once in a shutdown mode the CMR will only process a DEACTIVATE event. During the DEACTIVATE event the CMR will revoke the shutdown mode by resetting the shut-down flag. If an event other than a DEACTIVATE event is attempted while the CMR is in shutdown mode, the CMR will issue a message requesting that the gateway LU be DEACTIVATED.

The CMR is also involved in abend recovery if one of the Service Pool machines abends. When an abend occurs in a Service Pool machine, control is given to the ABEND exit that was specified when the Service Pool machine was autologged. The Service Pool machine's ABEND exit routine will perform clean up processing and logoff the Service Pool virtual machine. This causes the connection between the Service Pool machine and network to be severed. The CMR gains control after the sever occurs with a Deallocate Event. The CMR will invoke the Deallocate routine to mark the Service Pool machine available for use.

The AVS will invoke the CMR for any LU6.2 session associated with a remote LU which is terminated because of a communication layer failure. The CMR will be invoked with an Attention Loss event. The CMR will then sever all connections for that session and logoff the Service Pool machines associated with that session. These Service Pool machines will be reset and marked available for use.

The CMR does not directly issue any messages to the user. The CMR executes as an entity of AVS and therefore certain conditions relating to Conversation Management Routines will be notified directly by AVS. When error situation conditions occur the CMR will report error messages to the AVS operation via the appropriate GCS macro.

In operation, a control program system at a station will have at least one associated CMR that manages its Service Pool virtual machines. Each GATEWAY LU may only have one CMR associated with it, specified in the AVS ACTIVATE GATEWAY command.

The CMR typically resides in a GCS loadlib made known by a previous GCS global loadlib command. When the AVS operator issues the AVS ACTIVATE GATEWAY command, the associated CMR is loaded into GCS private storage, where it will execute. AVS will call the CMR with the parameter list for an ACTIVATE event. This will cause the CMR to prepare the Service Pool environment for processing of requests. Therefore the first invocation of the CMR always specifies an ACTIVATE event.

The linkage between AVS and each CMR will be a standard GCS linkage with registers pathing respectively to a list of addresses, each of which contains the address of a parameter, to a register save area, to the return address, and to the entry point address.

Subsequent invocations of the CMR take place when other events occur associated with the GATEWAY LU. At that time the CMR is called via its main entry point and is passed the address of a parameter list, in accordance with one of Tables 2–7, according to the event.

A remote requester at a PWS will initiate the conversation with the system providing the service pool by requesting a connection to a private resource located at a non-dedicated Private GATEWAY LU. The AVS machine and the GATEWAY LU are both defined to the VTAM which will route the request to the AVS machine that owns that GATEWAY. The CMR defined for the GATEWAY LU will be invoked by AVS. The CMR will select the Service Pool Virtual Machine ID to which this request should be routed. AVS will then translate the incoming connection request to an APPC/VM connect request for the selected Service Pool Virtual Machine. If the Service Pool Virtual Machine is not logged on, it is autologged and its Task Handler is invoked. The CMR requires the flowing of a (Userid, password) pair on the inbound connection request, and the control program will verify that the flowed userid and password pair is valid. If it is valid, the control program then queues a connection pending interrupt for the Service Pool Virtual Machine userid. If the pair is not valid, the connection request is rejected and a connection is not established.

Whilst this invention has been described with reference to a specific implementation under a particular operating system, it will be appreciated that the invention as set forth in the appended claims is of wider application, and may be adopted in other cooperative processing environments in which there is a need for management of an available pool of defined virtual machines at a network station.

We claim:

1. A computer system implementing multiple virtual machines, and forming one station in a network including at least one other station running a program for which said one station can, on request, perform host processes using virtual machines which it implements; the system having the resources to provide a pool of preconfigured virtual machines to service such requests and the system implementation including means to manage conversations associated with such requests by responding to events relating to such conversations; and the conversation management means comprising a main task and a sub-task spawned by the main task to preestablish an exit from the conversation management means in the event of error, said system further comprising:

means for providing data as to the identity and status of virtual machines in said pool of preconfigured machines; sub-task routines, associated with said means for providing, called selectively to handle different events relating to conversations;

means for maintaining said providing means by the sub-task in accordance with said events; and said main task having means for controlling spawning or waking-up of the sub-task in direct response to an event, and kills or leaves dormant the sub-task in response to messages from the sub-task following processing of an event.

2. A computer system according to claim 1, wherein the events handled by the sub-task are the activation and deactivation of the conversation management routine, the allocation and deallocation of virtual machines in the pool, the occurrence of network attention loss, and the occurrence of abnormal endings of sub-task routines.

3. A computer system according to claim 2, wherein the main task spawns the sub-task in response to an activation or invalid event, and the sub-task includes means for preestablishing said exit on spawning, and return means responsive to the handling of a deactivation or invalid event, which cancels said exit and signals the main task to kill the sub-task, and wherein the main task wakes up the sub-task in response to other of the events.

4. A computer system according to claim 2, wherein the sub-task further includes error handling means to identify, record and externally signal abnormal endings of subroutines and initiate an abnormal ending event.

5. A computer system according to claim 1, wherein the conversation management means is associated with a communications area control block storing data passed between the main task and the sub-task, and the sub-task is associated with a control block initialized thereby and storing data used by the sub-task.

6. A computer system according to claim 5, wherein the sub-task is further associated with control blocks storing data relating to the diagnosis and tracing of errors and the generation of error messages.

7. A computer system implementing multiple virtual machines, and forming one station in a network including at least one other station running a program for which said one station can, on request, perform host processes using virtual machines which it implements; the system having the resources to provide a pool of preconfigured virtual machines to service such requests and the system implementation including means for managing conversations associated with such requests by responding to events relating to such conversation; said system comprising:

a main task in said conversation management means;

a sub-task, spawned by said main task, having routine means called selectively to handle different events relating to management of conversations and having routine means to preestablish an exit in the event of error;

means for gaining control by the preestablished exit routine, when an abend occurs in one of the preconfigured virtual machines, to logoff the one preconfigured virtual machine thereby severing its connection to the network;

means for gaining control, after the sever occurs, by the main task with a Deallocate event; and means for invoking a deallocate routine means in the sub-task to mark the one preconfigured virtual machine as available for use.

8. A computer program product comprising a recorded program to establish a conversation management routine in a computer system implementing multiple virtual machines, and forming one station in a network including at least one other station running a program for which said one station can, on request, perform host processes using virtual machines which it implements; the system having the resources to provide a pool of preconfigured virtual machines to service such requests and the system implementation including a routine to manage conversations associated with such requests by responding to events relating to such conversations; said computer program product comprising:

a main task and a sub-task, within said conversation management routine, and said sub-task spawned by the main task to preestablish an exit from the routine in the event of error; and routines, in said sub-task, called selectively to handle different events relating to conversations, associated with means for providing data as to the identity and status of virtual machines in said pool of preconfigured machines, said means being maintained by the sub-task in accordance with said events; and said main task is a routine which controls spawning or waking-up of the sub-task in direct response to an event, and kills or leaves dormant the sub-task in response to messages from the sub-task following processing of an event.

9. A computer program product comprising a stored program to establish a conversation management routine in a computer system implementing multiple virtual machines, and forming one stations in a network including at least one other station running a program for which said one station can, on request, perform host processes using virtual machines which it implements; the system having the resources to provide a pool of preconfigured virtual machines to service such requests and the system implementation including a routine to manage conversations associated with such requests by responding to events relating to such conversations; said computer program product comprising:

a sub-task spawned by a main task;

routines in said sub-task, called selectively to handle different events relating to management of conversations;

preestablished exit routines in said sub-task for handling error events;

means for gaining control by the preestablished exit routine, when an abend occurs in one of the preconfigured virtual machines, to logoff the one preconfigured virtual machine thereby severing its connection to the network;

means for gaining control, after the sever occurs, by the main task with a Deallocate event; and means for invoking a deallocate routine means in the sub-task to mark the one preconfigured virtual machine as available for use.

10. A product according to claim 9, wherein the sub-task also includes means to maintain data as to the identity and status of virtual machines in the pool.

11. A method for use in a computer system implementing multiple virtual machines, and forming one station in a network including at least one other station running a program for which said one station can, on request, perform host processes using virtual machines which it implements; the system having the resources to provide a pool of preconfigured virtual machines to service such requests and the system implementation including a routine to manage conversations associated with such requests by responding to events relating to such conversations; said method comprising:

preestablishing, by a sub-task spawned by a main task, an exit from the routine in the event of error;

calling selectively routines, in said sub-task, to handle different events relating to conversations;

providing data, in accordance with said events, as to the identity and status of virtual machines in said pool of preconfigured machines; and controlling, by said main task, spawning or waking-up of the sub-task in direct response to an event, and killing or leaving dormant the sub-task in response to messages from the sub-task following processing of an event.

12. A method for use in a computer system implementing multiple virtual machines, and forming one station in a network including at least one other station running a program for which said one station can, on request, perform host processes using virtual machines which it implements; the system having the resources to provide a pool of preconfigured virtual machines to service such requests; said method comprising:

managing conversations associated with such requests by responding to events relating to such conversations;

calling selectively routines in a sub-task spawned by a main task to handle different events relating to managing conversations;

preestablishing exit routines in said sub-task for handling error events;

gaining control by the preestablished exit routine, when an abend occurs in one of the preconfigured virtual machines, to logoff the one preconfigured virtual machine thereby severing its connection to the network;

means for gaining control, after the sever occurs, by the main task with a Deallocate event; and means for invoking a deallocate routine in the sub-task to mark the one preconfigured virtual machine as available for use.

* * * * *